United States Patent
Mulhauser et al.

(10) Patent No.: US 7,448,315 B2
(45) Date of Patent: Nov. 11, 2008

(54) FOOD DRYING DEVICE WITH SEPARABLE LID AND COVER

(75) Inventors: Paul Mulhauser, New York, NY (US); Rebecca Taylor, Brooklyn, NY (US)

(73) Assignee: Helen of Troy Limited, St. Michael (BB)

( * ) Notice: Subject to any disclaimer, the term of this patent is extended or adjusted under 35 U.S.C. 154(b) by 157 days.

(21) Appl. No.: 11/082,332

(22) Filed: Mar. 17, 2005

(65) Prior Publication Data

US 2006/0207441 A1    Sep. 21, 2006

(51) Int. Cl.
*A47J 37/00* (2006.01)
(52) U.S. Cl. .................... 99/495; 99/511; 34/58
(58) Field of Classification Search ........... 99/510–513, 99/492, 495, 536; 34/58, 184; 494/60, 84
See application file for complete search history.

(56) References Cited

U.S. PATENT DOCUMENTS

| | | | |
|---|---|---|---|
| 417,799 A | 12/1889 | Waldbaur | |
| 2,174,018 A | 9/1939 | Schaum | |
| 3,226,016 A * | 12/1965 | Couper et al. ............ | 494/7 |
| 3,300,871 A | 1/1967 | O'Conor | |
| 3,753,297 A | 8/1973 | Mantelet | |
| 3,885,321 A | 5/1975 | Fouineteau | |
| 4,007,751 A | 2/1977 | Commiant | |
| 4,090,310 A | 5/1978 | Koff | |
| 4,103,432 A | 8/1978 | Dieterich et al. | |
| 4,114,286 A * | 9/1978 | Bingham ................. | 34/58 |
| 4,189,850 A | 2/1980 | Dieterich et al. | |
| 4,209,916 A | 7/1980 | Doyel | |
| 4,412,390 A | 11/1983 | Grant | |
| 4,493,156 A | 1/1985 | Siegmann | |
| 4,702,162 A | 10/1987 | Sontheimer et al. | |
| 4,742,624 A | 5/1988 | Grant | |
| 4,809,723 A | 3/1989 | Meliconi | |
| 5,027,530 A | 7/1991 | Vollmer et al. | |
| 5,054,209 A | 10/1991 | Koff | |
| 5,064,535 A * | 11/1991 | Hsu ...................... | 210/380.1 |
| 5,156,084 A | 10/1992 | Lin | |
| 5,212,876 A | 5/1993 | Berit | |
| 5,282,319 A | 2/1994 | Casquilho et al. | |
| 5,562,025 A | 10/1996 | Bull et al. | |
| 5,647,140 A | 7/1997 | Hudspeth | |
| 5,778,769 A | 7/1998 | Dodson | |
| 5,802,733 A | 9/1998 | Hougham | |
| 5,865,109 A | 2/1999 | Bull | |
| 5,904,090 A | 5/1999 | Lillelund et al. | |
| 5,966,830 A | 10/1999 | Schnacke | |
| 5,992,309 A | 11/1999 | Mulhauser et al. | |

(Continued)

OTHER PUBLICATIONS

Instruction manual for BonJour salad spinner (© 2002).

*Primary Examiner*—Timothy F. Simone
(74) *Attorney, Agent, or Firm*—Seyfarth Shaw LLP

(57) ABSTRACT

A device for drying food is disclosed in an embodiment as a container including a bowl having a side wall terminating at a top edge defining an opening and a cover substantially covering the opening; a basket assembly disposed in the bowl and rotatable relative to the container about an axis at a variable rate of rotation, the basket assembly including a basket having a side wall terminating at a top edge; and a lid, the lid being releasably coupled to the basket and the cover.

12 Claims, 6 Drawing Sheets

U.S. PATENT DOCUMENTS

| | | |
|---|---|---|
| 6,018,883 A | 2/2000 | Mulhauser |
| 6,343,546 B2 * | 2/2002 | Ancona et al. ................. 99/495 |
| 6,473,988 B1 | 11/2002 | Mulhauser et al. |
| 6,510,785 B1 | 1/2003 | Margolin |
| 6,622,618 B1 | 9/2003 | Glucksman et al. |
| 2001/0035101 A1 | 11/2001 | Ancona et al. |

* cited by examiner

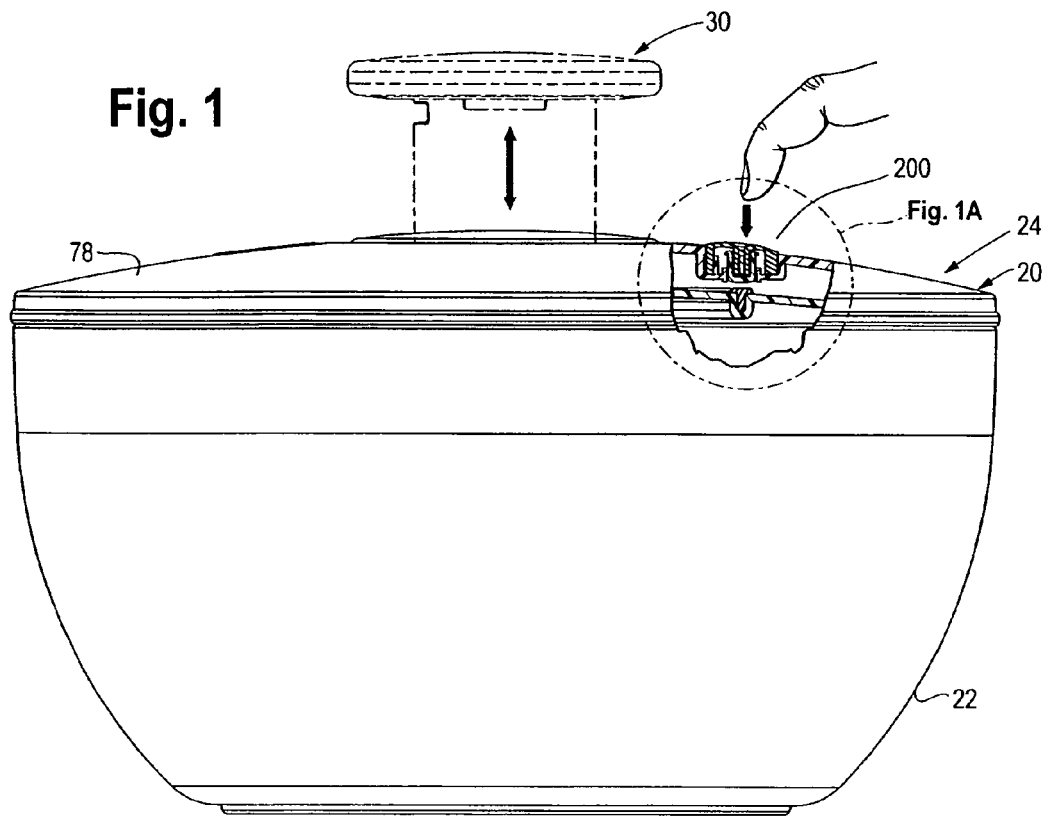

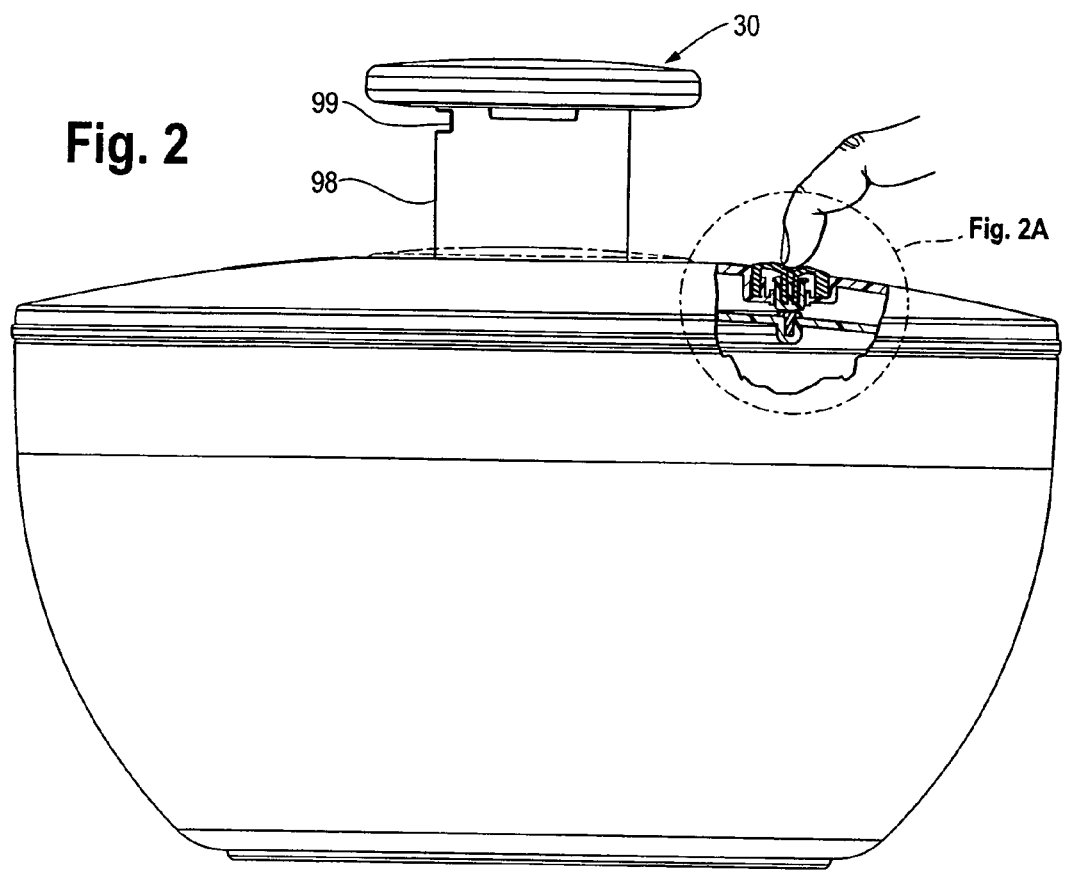
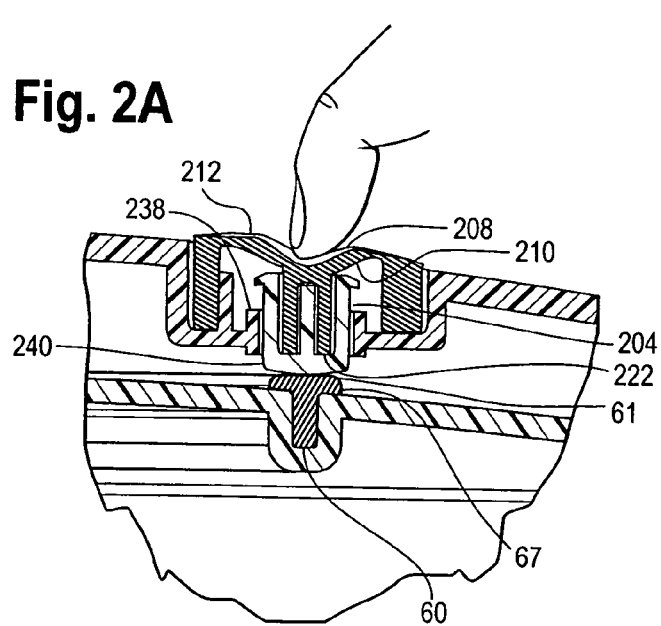

FOOD DRYING DEVICE WITH SEPARABLE LID AND COVER

TECHNICAL FIELD

This invention relates to spinning devices for drying wet food, such as salad spinners, and more particularly, to lids capable of being separated from associated covers to be cleaned.

BACKGROUND

Various devices for drying food, such as salad spinners, are known. These salad spinners usually include a bowl, a cover connected to the bowl, a perforated basket, and a crank-type, lever, pull cord or other such actuator coupled to the basket for spinning the same. These prior spinners, however, are not always stable when actuated, often moving laterally during actuation, which can be merely an annoyance or may cause the spinner to fall off its support to the floor. These falls may cause the spinner to be damaged or food contents thereof to be spilled. To safely use the spinner, a user must often hold down the spinner with one hand and actuate with the other hand.

Additionally, although some such devices include rotating lid mechanisms for covering the basket while spinning, these mechanisms generally may collect food particles between the lid and the cover and, if the cover and lid are clear, may exhibit undesirable water stain markings on difficult to access inner surfaces and are not capable of having such particles or watermarks removed therefrom.

SUMMARY

It is a general object of the invention to provide an improved device for drying food which avoids the disadvantages of prior devices while affording additional structural and operating advantages.

An important feature of the invention is the provision of a device of the type set forth which has a lid that is releasably coupled to the cover such that food particles that are trapped therebetween can be removed.

An important feature of the invention is the provision of a device of the type set forth which which has a brake to quickly stop the basket from spinning soiling a user or contaminating the food being dried in the basket.

A further feature of the invention is the provision of a device of the type set forth which can be used with ease and convenience.

In connection with the foregoing feature, a further feature of the invention is the provision of a device of the type set forth, which can be operated with one hand while the bowl remains stationary in use.

Certain ones of these and other features of the invention may be attained by providing a device for drying food comprising a container including a bowl having a side wall terminating at a top edge defining an opening and a cover substantially covering the opening; a basket assembly disposed in the bowl and rotatable relative to the container about an axis at a variable rate of rotation, the basket assembly including a basket having a side wall terminating at a top edge; and a lid, the lid being releasably coupled to the basket and the cover.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a side elevational view of one embodiment of the device for drying food of the present invention, with a partial fragmentary sectional view of the brake assembly in a non-engaged condition;

FIG. 1A is an enlarged, fragmentary view of the brake assembly shown in FIG. 1;

FIG. 2 is a side elevational view of the embodiment of the device for drying food of FIG. 1, with a partial fragmentary sectional view of the brake assembly in an engaged condition;

FIG. 2A is an enlarged, fragmentary view of the brake assembly shown in FIG. 2;

DETAILED DESCRIPTION

Figure 3:
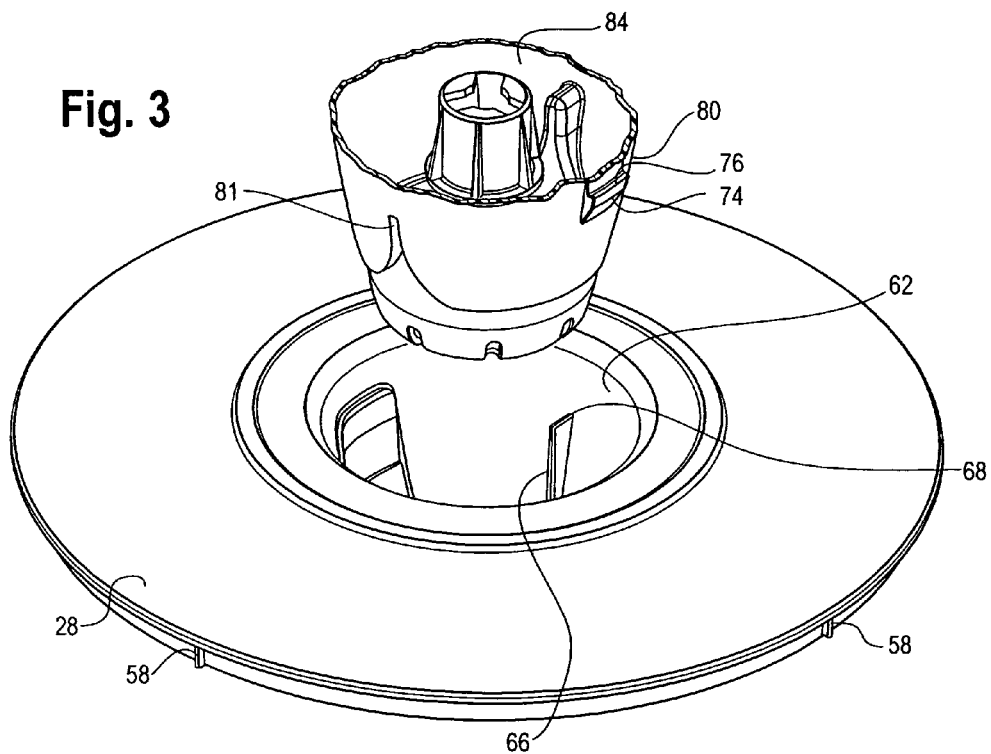
FIG. 3 is a partial fragmentary perspective top view of an embodiment of the lid and cover in a disengaged condition.
Figure 4:
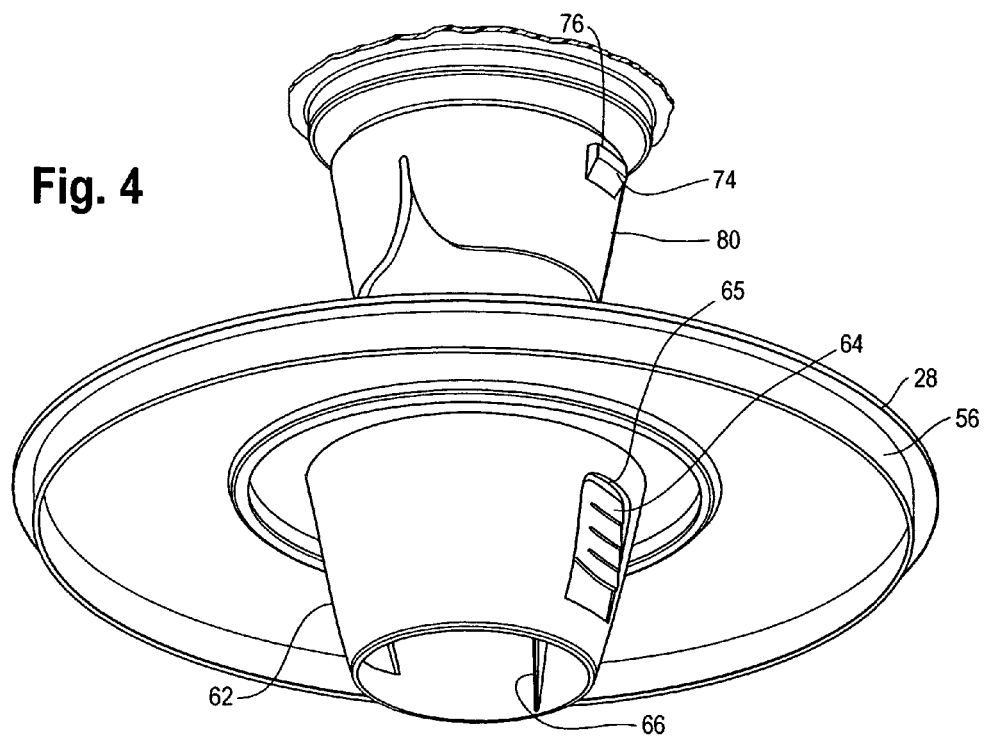
FIG. 4 is a partial fragmentary perspective bottom view of an embodiment of the lid and cover in a disengaged condition.

Referring to FIGS. 1-7, a device for drying food, such as a salad spinner 20, is provided. The salad spinner 20 generally includes a container having a bowl 22 and a cover 24 for the bowl 22, a perforated basket 26 disposed in the bowl 22, a lid 28 for the basket 26 and a drive assembly 30 for rotating the perforated basket 26 via the lid 28 relative to the container.

The bowl 22 is circular in shape and has a central vertical axis A (shown in FIG. 8) and a bottom wall 32 having a cone-shaped projection 34 in its center. The bowl 22 also includes a sidewall 36 terminating in a top edge 38 and a foot 40 connected to the bottom wall 32 and preferably made of a non-slip material.

Figure 7:
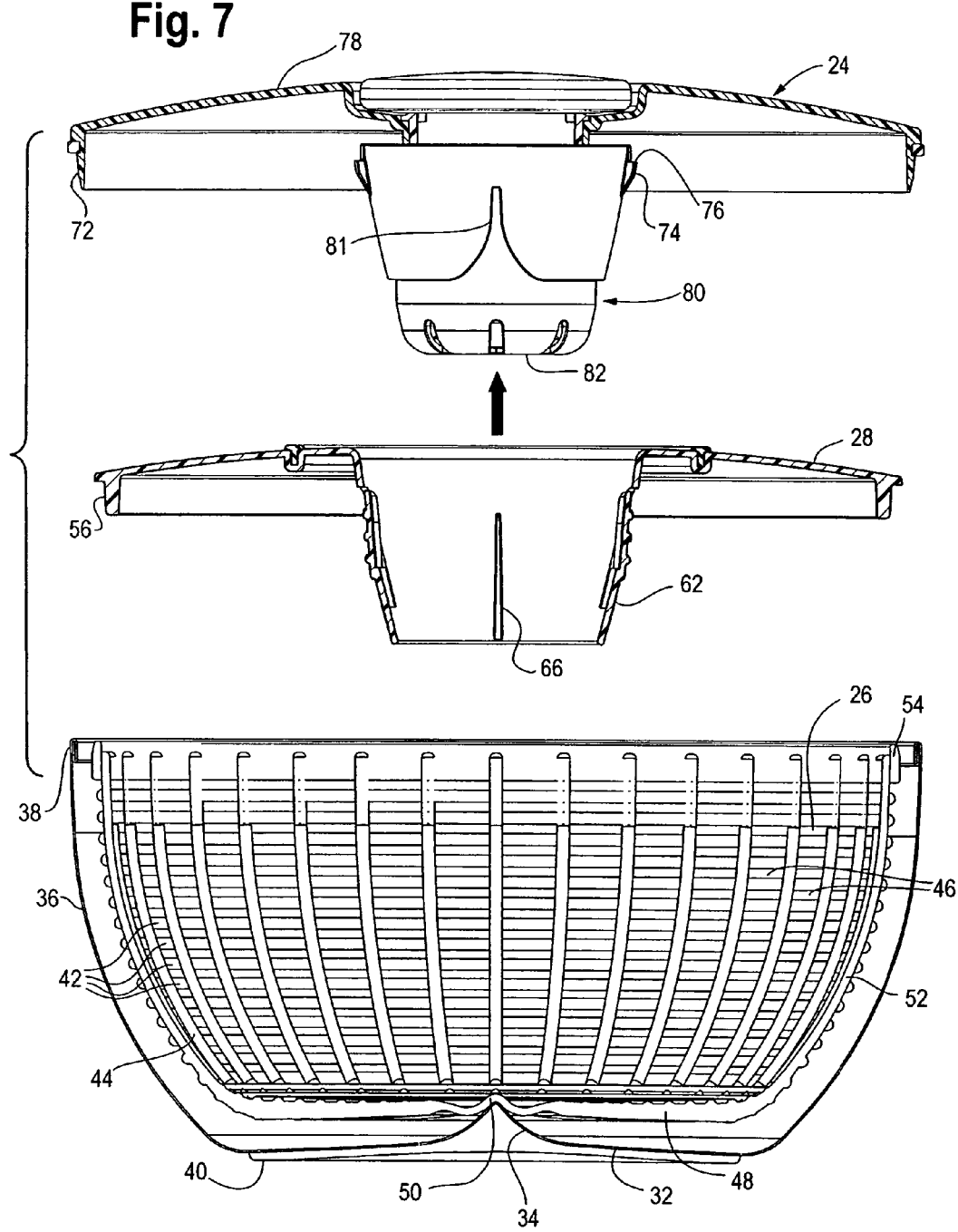
FIG. 7 is an exploded cross-sectional view of the embodiment of FIG. 1.

The basket 26, as best seen in FIG. 7, includes a plurality of latitudinal, coaxial circular ribs 42 connected by a plurality of longitudinal ribs 44 of various lengths. The ribs 42 and 44 cooperate to define a plurality of various sized, generally rectangular apertures 46. The basket 26 also includes a bottom 48 having a cone-shaped projection 50 at its center which sits atop cone-shaped projection 34 to form a rotational bearing. The ribs 42 and 44 together form a sidewall 52 terminating at an upper edge 54.

The lid 28, as best seen in FIGS. 1A, 2A, 3, 4 and 7 includes a cylindrical peripheral sidewall 56 having a plurality of ribs 58 projecting outwardly therefrom. Referring to FIG. 3, the ribs 58 cooperate to provide a releasable coupling for releasably coupling with a plurality of mating ribs projecting inwardly from the cylindrical peripheral edge 54 of the basket 26.

The lid 28 can be of unitary construction or made up of more than one piece and may fully cover the basket or may be of open or perforated structure. The lid 28 may also include an annular groove 60 supporting a ring 67. The lid 28 includes a frustoconical shaped central portion 62 depending from the lid 28, a cover engagement member 64 integral with the frustoconical shaped central portion 62 and forming a shoulder 65, and an internal, upwardly projecting portion 66 integral with the central portion 62. The upwardly projecting portion 66 varies in width and has a shoulder surface 68 formed thereon.

As seen in FIG. 7, the cover 24 includes a cylindrical sidewall 72 having an outer diameter substantially equal to the inner diameter of the top edge 38 of the bowl 22 thereby forming a friction fit therebetween. The cover 24 also has an upper surface portion 78, a depending, substantially frustoconical shaped central surface portion 80, a bottom surface portion 82 and a generally cylindrical upwardly projecting portion 84 (shown in FIG. 3) disposable coaxially about a portion of the upwardly projecting portion 66 of the lid 28. A plug 75 closes the lower end of the upwardly projecting portion 66 to prevent food from entering the interior thereof. The upwardly projecting portion 84 engages drive assembly 30.

As best seen in FIGS. 3-7, the cylindrical surface portion 80, includes slots 81 running a portion of the length of the frustoconical shaped central surface portion 80. Upwardly projecting portions 66 engage slots 81, the upper end of the slots 81 coming to rest on shoulders 68.

Figure 5:
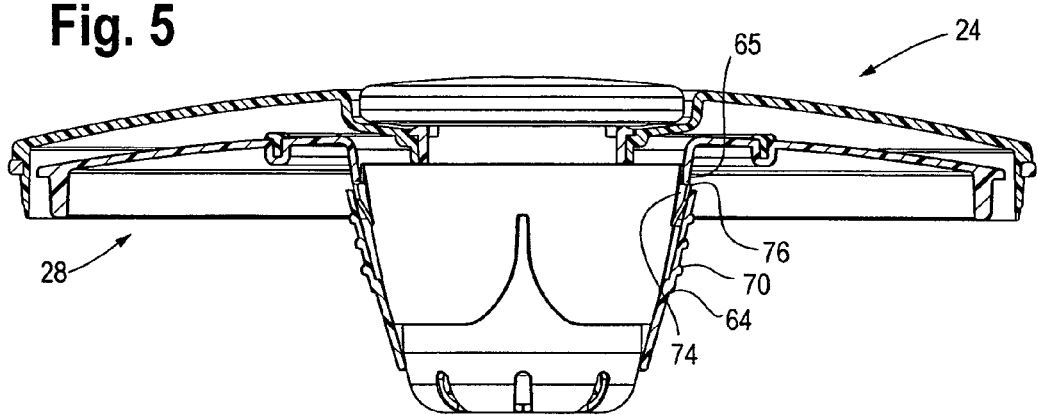
FIG. 5 is a cross-sectional side view of an embodiment of the lid and cover of FIGS. 3 and 4 in an engaged condition.
Figure 6:
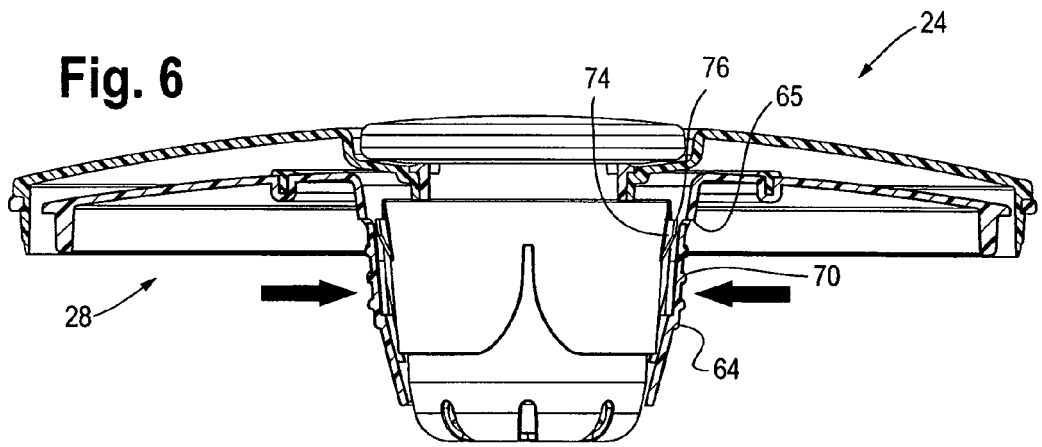
FIG. 6 is a cross-sectional side view of an embodiment of the lid and cover of FIG. 5 in an engaged condition, showing the direction of the application of force to disengage the lid and cover.

As illustrated in FIGS. 3-6, cover 24 is releasably engageable with lid 28. The releasable engagement is accomplished by cover engagement member 64 of lid 28 biasing out of its resting position as lid engagement member 74 of cover 24 passes internally downward in frustoconical shaped central portion 62. Lid engagement members 74 include shoulders 76, which come to rest in an abutting engagement with shoulders 65 of frustoconical shaped central portion 62. Thus, as detailed further below, rotational movement of lid 28 in one embodiment is accomplished by the engagement between slots 81 and upwardly projecting portions 66, as well as cover engagement member 64 and lid engagement member 74. To disengage the cover 24 from the lid 28, the user depresses cover engagement member 64 along grips 70, which provide increased tactile engagement and applies force sufficient to deform frustoconical shaped central portion 80 and push lid engagement members 74 further inside frustoconical shaped central portion 62 so that shoulders 76 do not engage shoulders 65, as illustrated in FIGS. 5-6. Permitting lid 28 and cover 24 to releasably engage one another allows a user to separate the lid 28 from cover 24 and remove any food debris that becomes trapped therebetween.

Figure 8:
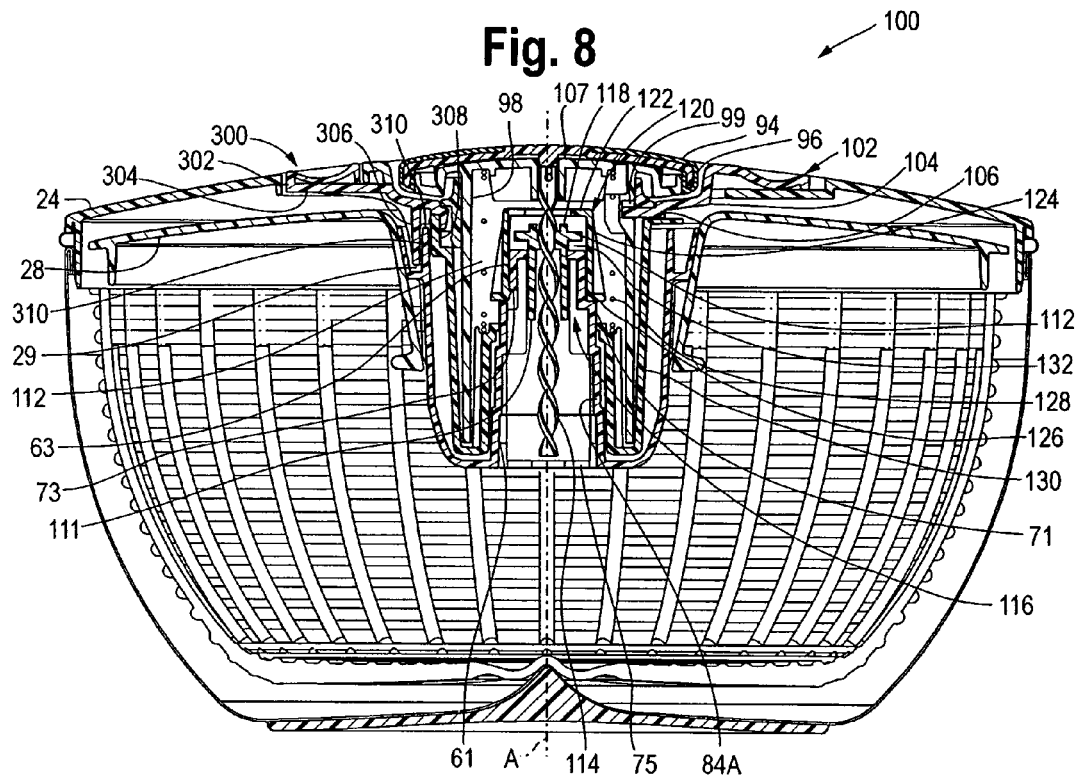
FIG. 8 is a cross-sectional view of an alternative embodiment of brake assembly for the device of FIG. 2 in a non-engaged condition.

Referring to FIG. 8, the drive assembly 30 includes a linearly reciprocating handle structure 94 (or plunger assembly) moveable along vertical axis A. The reciprocating handle structure 94 includes a disc shaped upper end 96, or button structure, and a coaxial cylindrical sidewall 98 depending therefrom. The cylindrical sidewall 98 has a slot 99 adjacent to its upper end.

Referring again to FIG. 8, the drive assembly 30 may also include a conversion mechanism 112 for converting the reciprocating movement of the handle structure 94 to rotary motion of the basket 26. The conversion mechanism 112 includes an elongated helical screw shaft 114 coaxial with the handle structure 94 and connected at one end to the disc shaped upper end 96, preferably by a pin 107. The elongated helical shaft 114 extends a slight distance below the lower end of the cylindrical sidewall 98.

The conversion mechanism 112 also includes a nut 116 having a slot 118 shaped to receive the helical shaft 114 therethrough for screw-type engagement therewith.

As seen in the embodiment of FIG. 8, the drive assembly 30 also includes a cap 120 having a top wall 122 and a substantially cylindrical sidewall 124. The substantially cylindrical sidewall 124 includes a radially inwardly extending projection 126 at its bottom end. The cap 120 is disposed about the terminal end 63 of the upwardly projecting portion 61 of the lid 28 above shoulder surface 71 and the projection 126 is disposed in slot 73 to maintain the cap 120 attached to upwardly projecting portion 61. The cap 120 limits the axial movement of the nut 116.

Referring again to FIG. 8, the drive assembly 30 also includes a helical compression spring 128 seated in groove 130 of the upwardly projecting portion 84a and against the disc shaped upper portion 96 of the reciprocating handle structure 94.

In operation, the drive assembly 30 works as follows. The conversion mechanism 112 is typically in a non-engaged normal rest condition where the engaging portions (not shown) of the nut 116 are spaced apart axially from the engaging portions 132 of the lid 28. The spring 128 biases the drive assembly 30 to this condition.

When downward force is applied to the disc shaped upper portion 96 of the reciprocating handle structure 94, the reciprocating handle structure 94, the attached helical shaft 114 and the nut 116 initially move together axially downwardly so that the engaging portions of nut 116 contact associated engaging portions 132 of the lid 28. The conversion mechanism 112 is now in the engaged condition.

Continuing application of force in the same direction causes the helical shaft 114 to axially move through the slot 118 of the nut 116 to rotate the nut 116. This causes engaging portions of the rotating nut 116 to contact the engaging portions 132 of the lid 28 to rotate the lid 28 and the perforated basket 26 coupled thereto about vertical axis A. The reciprocating handle structure 94 may be plunged down until the disc shaped upper end 96 or other portion of reciprocating handle structure contacts a portion of the cover 24. When downward force is terminated, the nut is free to climb the helical shaft 114 so as to decouple from the engagement portions 132 of the lid 28 as the lid 28 continues to rotate. When downward force is no longer applied, the spring 128 causes the reciprocating handle structure 94, the helical shaft 114 and the nut 116 to initially move axially upwardly together until the nut 116 contacts the top wall 122 of the cap 120 to stop further axial movement of the nut 116. The conversion mechanism 112 is now in its disengaged condition. The helical shaft 114 and the reciprocating handle structure 94, however, continue to move axially upward. During this axial movement, the helical shaft 114 moves through the slot 118 of nut 116 causing it to rotate. Repeated plunging motions may be applied, as necessary, to rotate the basket 26 in which wet or washed food is placed. The rotation of the perforated basket 26 causes the liquid on the food to be sent out of the perforated basket 26 through apertures 46 by centrifugal force into the bowl 22, thereby drying the food in the basket.

In addition to the engagement described above, which may couple the lid 28 to the basket 26, the ribs 44 of the perforated basket 26 and the ribs 58 of the lid 28 cooperate to ensure that the basket 26 rotates when the reciprocating handle structure 94 is plunged down. When the lid 28 is rotated, each rib 58 thereof can contact a rib 44 to rotate the perforated basket 26.

Alternatives to drive assembly 30 may also be used with the present invention. For example, the conversion mechanism of the drive assembly could include a gearing system wherein the linear reciprocating handle structure (or plunger assembly) may include a shaft having a vertically disposed gear rack. The gearing system would also include an annular gear rack disposed on or coupled to the lid 28 (and basket 26) and an intermediary primary gear coupling the vertical gear rack to the annular gear rack. When downward force is applied to the plunger assembly, the vertical gear rack engages the primary gear, which in turn engages the circular rack to rotate the lid and basket coupled thereto. When downward stroke is terminated, the intermediate gear is then free to decouple from the circular rack as the lid 28 continues to rotate with basket 26.

Figure 8A:
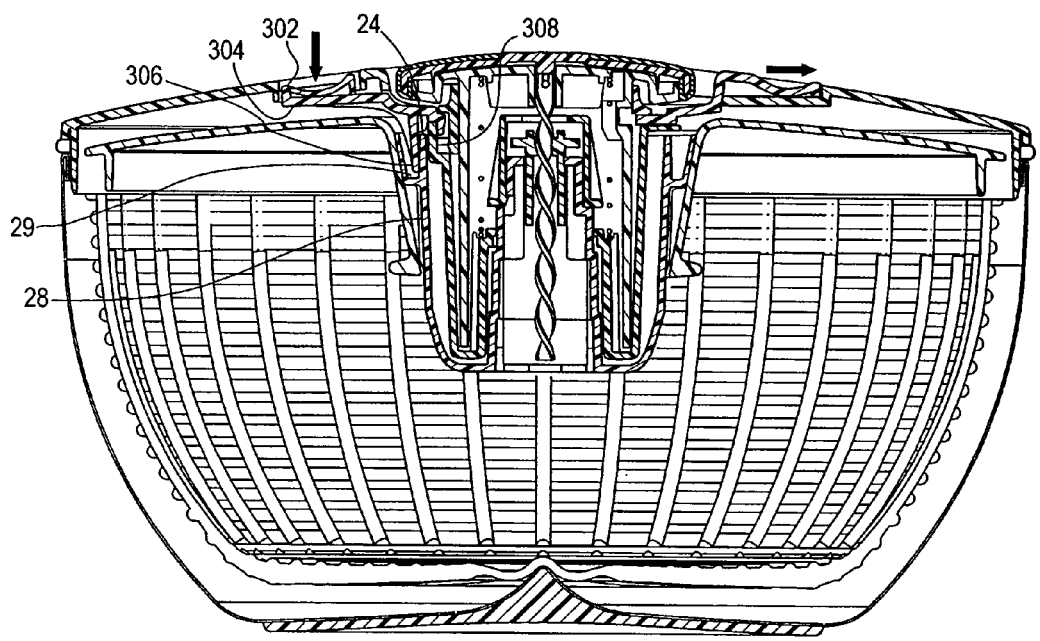
FIG. 8A is a cross-sectional view of the brake assembly of FIG. 8 in an engaged condition.

As illustrated in FIGS. 8 and 8A, the salad spinner 20 may include a stop mechanism 100 to prevent axial movement of the reciprocating handle structure 94. The stop mechanism 100 includes the slot 99 of the cylindrical sidewall 98 and a latch 102 supported by the cover 24.

The latch 102 includes a central portion 104 terminating in a projection 106. As seen in FIGS. 8 and 8A, when it is desired to prevent axial movement of the reciprocating handle structure 94, the handle structure 94 is fully depressed and the latch 102 is slid so that the projection 106 is placed in slot 99 of the reciprocating handle structure 94.

Referring again to FIGS. 1-2A, a salad spinner 20 is illustrated having a brake assembly 200 is provided to stop the rotation of the basket 26 and the cover 24 is provided to accommodate the brake assembly 200.

The brake assembly 200 includes an actuator 202 coupled to a brake pad. The actuator 202 is formed of a flexible, resilient material, such as a rubber or plastic, and is shaped and dimensioned to be flexible and resilient. The actuator 202 includes an annular sidewall 206 connected to a top wall 208. The top wall 208 has interior and exterior surfaces 210, 212 and a substantially cylindrical projection 214 depending from the interior surface 210 centrally thereof. The projection 214 has an axial bore 216 in its distal end.

The brake pad 204 is formed of a hard material, such as a plastic. The brake pad 204 includes a cylindrical sidewall 220 and a bottom wall 222 integral therewith. The sidewall 220 has a radially outwardly extending annular flange 220A at its open end. The bottom wall 222 and the cylindrical sidewall 220 define a bore 218. The bottom wall 222 has interior and exterior surfaces 224, 226. The brake pad 204 also has a cylindrical projection 228 projecting up from the interior surface 224 of the bottom wall 222, centrally thereof.

As seen in FIGS. 1A and 2A, the brake pad 204 is coupled, by an interference fit, or the like, to the actuator 202. Specifically, the cylindrical projection 214 of the actuator 202 is disposed in the bore 218 of the cylindrical sidewall 220 of the brake pad 204. Additionally, the cylindrical projection 228 of the brake pad 204 is disposed in the inner bore 216 of the cylindrical projection 214 of the actuator 202.

As seen in FIG. 1A, the cover 24 has interior and exterior surfaces 229A, 229B and includes a circular opening bounded by a cylindrical sidewall 230 depending from the interior surface 229A of the cover 24 and integral at its distal end with a bottom wall 232. Upstanding from the bottom wall 232 is a first annular sidewall 234 having a radial slot 236. A second annular sidewall 238, shorter and thicker than first annular sidewall 234 and coaxial therewith, extends both below and above the bottom wall 232. The second annular sidewall 238 is disposed radially inwardly from the first annular sidewall 234. The second annular sidewall 238 defines an aperture 240. The bottom wall 232 may also include apertures generally between the sidewalls 234 and 238. The apertures would allow moisture or water to flow out of the circular opening as necessary.

The brake assembly 200 is supported and carried by the cover 24. The sidewall 206 of the actuator 202 is disposed between cylindrical sidewall 230 and the first annular sidewall 234 and rests on the bottom wall 232. The first annular sidewall 234 has an outer diameter substantially equal to the inner diameter of the sidewall 206 of the actuator 202 to form an interference fit therewith. When the brake assembly 200 is carried by cover 24, the top wall 208 of the actuator 202 is advantageously disposed at the exterior surface 229B of the cover 24. The brake pad 204 extends into the aperture 240 defined by the second annular sidewall 238.

The brake assembly 200 is moveable between a non-engaged position, as shown in FIGS. 1 and 1A, and an engaged position as shown in FIGS. 2 and 2A. In the non-engaged position, the lid 28 and basket 26 are free to rotate, as discussed above with respect to the first salad spinner 20 embodiment.

The lid 28 includes an annular brake surface 61 against which the brake pad 204 applies frictional force when in an engaged position. The annular brake surface 61 may be integral with the lid 28 or may be a separate ring 67 made part of the lid 28 by insertion into an annular groove 60. The ring 67 may be formed of a flexible, resilient material, such as rubber or plastic, and is shaped and dimensioned to be fit into the groove 60 of the lid 28. In the engaged position, the bottom wall 222 of the brake pad 204 contacts the annular brake surface 61 of the lid 28 to stop the rotation of the lid 28 and connected basket 26. Unaesthetic appearance of frictional abrasion from the brake pad 204 upon the lid 28 as can be seen though the clear cover 24 is minimized by localizing abrasion onto the annular brake surface 61.

The brake assembly 200 is moved, as seen in FIGS. 2 and 2A, to the engaged position simply by applying downward pressure, such as by a finger, on the top wall 208 of the actuator 202. The brake pad 204 coupled thereto is moved downward guided by the second annular sidewall 238 through aperture 240 to contact the lid 28, which stops the lid 28 and basket 26 from rotating. The second annular sidewall 238 also aids in preventing the brake pad 204 from being tilted by the rotating lid so that a large portion of the surface area of the bottom wall 222 of the brake pad 204 contacts the lid 28. The annular flange 220A will contact the top end of the second annular sidewall 238 to retain the brake pad 204 in assembly with the cover 24.

When pressure is released, the flexible resilient nature of the actuator 202 biases the brake assembly 200 back to the non-engaged position. Alternatively, a spring, such as a compression spring, or other biasing means, could be used to bias the brake assembly 200 to its non-engaged position thereby allowing the actuator 202 to be formed of most any material and/or to be integrally formed as a one-piece unit with the brake pad. Alternatively, the brake pad 24 may be coupled in a hinging manner to the cover 24 facilitating a controlled generally axial relationship of the brake pad 204 movement in relationship to the lid 28.

In another embodiment illustrated in FIGS. 8 and 8A brake assembly 300 is shown carried by cover 24. In this embodiment, brake assembly 300 includes actuator 302 and lever body 304. Lever body 304 includes a lid engagement arm 306 and a cover engagement arm 308. Cover engagement arm 308 has a series of shoulders 310 so as to engage cover 24 and provide a pivot point for lever body 304 as detailed below.

Lever body 304 is formed of a resilient material, such as plastic, that is sufficiently firm so as to transfer sufficient frictional force to lid 28 through lid engagement arm 306, so as to stop rotation of the lid 28. The frictional force applied through the lid engagement arm upon the rotating lid may also be sufficient force so as to cause the rotating lid 28 to press against a portion of the non-rotating cover 24 so as to more rapidly stop the rotation of the lid 28.

Lid 28 may include an annular groove 29 to accommodate lid engagement arm 306. In operation, as illustrated in FIGS. 8 and 8A, the user depresses actuator 302, thereby pressing down upon lever body 304. This application of force is transferred down lever body 304 to lid engagement arm 306 and cover engagement arm 308. Shoulders 310 reduce or prevent the movement of cover engagement arm 308, thus causing lever body 304 to pivot downward with lid engagement arm 306 contacting lid 28, forcing lid 28 into contact with cover 24 to halt the rotation of lid 28.

When the downward pressure applied by the user is released, the flexible resilient nature of integral protrusions (not shown) from the lever body 304 biases brake assembly 300 back to the non-engaged position. Alternatively, a spring, such as a compression spring, or other biasing means, could be used to bias the brake assembly 300 to its non-engaged position, thereby allowing the actuator 302 to be formed of most any material and/or to be integrally formed as a one-piece unit with the lever body 304.

While particular embodiments of the present invention have been shown and described, it will be appreciated by those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A device for drying food comprising:
   an open top container, a cover substantially covering the open top of the container;
   a basket disposed in the container and rotatable relative to the container about an axis;
   drive mechanism for effecting rotation of the basket;
   a lid releasably coupled to the basket and to the cover; and
   a retaining structure for resiliently retaining the lid on the cover, the retaining structure including a latch mechanism having first and second engagement portions respectively on the lid and the cover which are releasably engageable with each other.

2. The device of claim 1, wherein the first engagement portion is deflectable into and out of engagement with the second engagement portion.

3. A device for drying food comprising:
   an open top container, a cover substantially covering the open top of the container;
   a basket disposed in the container and rotatable relative to the container about an axis;
   drive mechanism for effecting rotation of the basket;
   a lid releasably coupled to the basket and to the cover; and
   a retaining structure for resiliently retaining the lid on the cover.

4. The device of claim 3, wherein the drive mechanism includes a rotatable portion, the lid being coupled to the rotatable portion for rotation therewith.

5. The device of claim 4, further comprising structure on the lid and on the rotatable portion of the drive mechanism to inhibit relative rotation thereof.

6. The device of claim 3, further comprising a brake assembly for reducing the rate of rotation of the basket relative to the container.

7. The device of claim 6, wherein the brake assembly includes a brake surface on the lid and a brake pad carried by the cover for movement into and out of engagement with the brake surface.

8. The device of claim 7, further comprising an actuator coupled to the pad for effecting movement of the pad into and out of engagement with the brake surface in directions substantially parallel to the axis.

9. The device of claim 8, wherein the brake surface is substantially annular in shape.

10. The device of claim 7, further comprising an actuator coupled to the pad for effecting movement of the pad into and out of engagement with the brake surface in directions substantially perpendicular to the axis.

11. The device of claim 10, wherein the lid is mounted for movement by the brake pad into frictional engagement with a non-rotating surface carried by the cover.

12. A device for drying food comprising:
   an open top container;
   a cover substantially covering the open top of the container;
   a basket disposed in the container and rotatable relative to the container about an axis;
   a drive mechanism for effecting rotation of the basket, said drive mechanism including a rotatable portion;
   a lid releasably coupled to the basket and to the cover, said lid being coupled to the rotatable portion of said drive mechanism for rotation therewith; and
   a structure on the lid and on the rotatable portion of the drive mechanism to inhibit relative rotation thereof.

* * * * *